3,382,155
FERMENTATION PREPARATION OF 12 BETA, 17 ALPHA-DIHYDROXY-A-NORPROGESTERONE
Seymour D. Levine, Princeton, and Pacifio A. Principe, South River, N.J., assignors, by mesne assignments, to E. R. Squibb & Sons, Inc., New York, N.Y., a corporation of Delaware
No Drawing. Original application June 25, 1965, Ser. No. 467,103. Divided and this application Oct. 19, 1966, Ser. No. 600,306
1 Claim. (Cl. 195—51)

ABSTRACT OF THE DISCLOSURE

This invention relates to a process for the preparation of the steroid having the formula

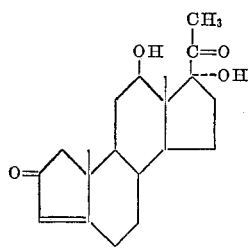

which comprises subjecting a 17α-hydroxy-A-norprogesterone to a microorganism, *Corticium microsclerotia*.

---

This is a divisional application of U.S. application, Ser. No. 467,103, filed June 25, 1965 and now abandoned.

This invention relates to and has as its object the provision of new physiologically active steroids, methods for their production and novel intermediates useful in said preparation.

More particularly, this invention relates to the provision of steroids of the formulae

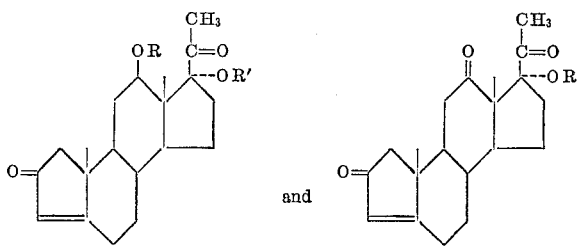

wherein R and R' are selected from the group consisting of hydrogen and acyl.

The preferred acyl radicals are those of hydrocarbon carboxylic acids of less than twelve carbon atoms, as exemplified by the lower alkanoic acids (e.g., acetic, propionic butyric and tert-pentanoic acid), the lower alkenoic acids, the monocyclic aryl carboxylic acids (e.g., benzoic and toluic acids), the monocyclic aryl lower alkanoic acids (e.g., phenacetic and β-phenylpropionic acid), the cycloalkane carboxylic acids and the cycloalkene carboxylic acids.

The novel compounds of this invention are pharmacologically active substances which possess anti-androgenic activity (i.e., they inhibit the actions of androgens), and which may be used in the treatment of such conditions as hyperandrogenic acne.

The compounds may be formulated for such administration, the concentration and/or dosage being based on the activity of the particular compound and the requirements of the patient.

The final products of the instant invention may be prepared by the processes of this invention which entails a number of steps beginning with 17α-hydroxy-A-norprogesterone as starting material. The preparation of this compound is disclosed in copending U.S. Patent application, Ser. No. 399,838, filed Sept. 28, 1964. The process of the instant invention may be represented by the following equations wherein R and R' are as hereinbefore defined:

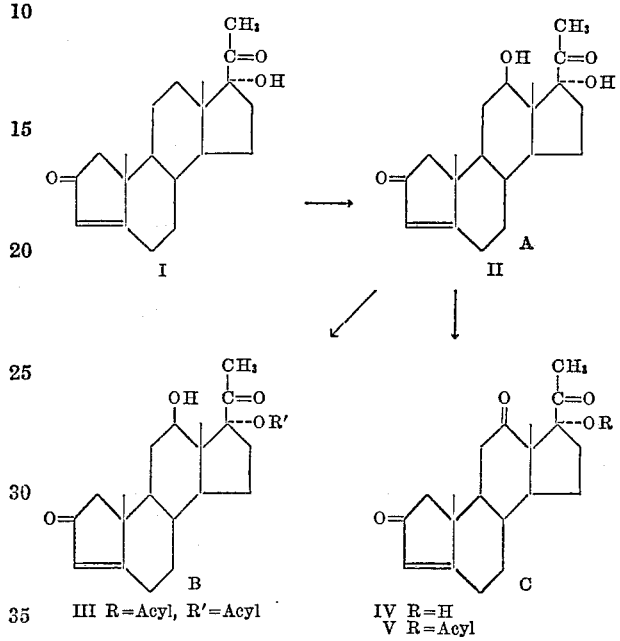

III R=Acyl, R'=Acyl
IV R=H
V R=Acyl

It has been found that a new intermediate compound (Compound A) of this invention, namely, 12β,17α-dihydroxy-A-norprogesterone can be prepared from the starting material by subjecting the latter to the action of a microorganism of the genus Corticium or to the action of the enzymes thereof under oxidizing and preferably aerobic conditions.

To prepare the compounds of this invention, the starting reactant may be first subjected to the action of enzymes of a microorganism of the genus Corticium under oxidizing conditions. This oxidation can best be effected either by including the starting reactant in an aerobic culture of the microorganism, or by bringing together in an aqueous medium, the compounds, air, and enzymes of non-proliferating cells of the microorganism.

In general, the conditions of culturing the microorganism for the purposes of this invention are (except for the inclusion of the starting reactant to be converted), the same as those of culturing various other microorganisms for the production of antibiotics, and other like substances. The microorganism is grown aerobically in contact with (in or on) suitable fermentation medium. A suitable medium essentially comprises a source of carbon and energy. The latter may be a carbohydrate, for example, molasses, glucose, maltose, starch or dextrin, a fatty acid, a fat and/or the compound itself. Preferably, however, the medium includes an assimilable source of carbon and energy in addition to the steroid. Among the fats utilizable for the purpose of this invention are lard oil, soybean oil, linseed oil, cottonseed oil, peanut oil, coconut oil, corn oil, castor oil, sesame oil, crude palm oil, fancy mutton tallow, sperm oil, olive oil, tristearin, tripalmitin, triolein and trilaurin. Among the fatty acids utilizable for the purpose of this invention are stearic acid, palmitic acid, oleic acid, linoleic acid and myristic acid.

The source of nitrogenous factors utilizable for the purposes of this invention may be organic (e.g., soybean meal, cornsteep liquor, yeast extract, meat extract and/or distillers' solubles) or synthetic (i.e., composed of simple, synthesizable organic or inorganic compounds, such as ammonium salts, alkali nitrates, amino acids or urea).

An adequate sterile air supply should be maintained during fermentation, for example, by the conventional methods of exposing a large surface of the medium to air or by utilizing submerged aerated culture. The compound may be added to the culture during the incubation period, or included in the medium prior to sterilization or inoculation. The preferred (but not limiting) range of the concentration of the compound in the culture is about 0.01% to about 0.1%. The culture period (or rather the time of subjecting the compound to the action of the enzyme) may vary considerably, the range of about twenty-four to ninety-six hours being feasible, but not limiting.

Compounds A are then acylated to form new Compounds B as by treatment with an excess of an acid anhydride, for example, acetic anhydride in the presence of perchloric acid to yield the 12β,17α-diacyloxy derivative. Alternatively, Compounds A may be oxidized directly by treatment with an equivalent amount of an oxidizing agent, such as chromic acid to form the 12-oxo derivatives of Compounds C. This latter compound may then be acylated as set forth above to form the 12-oxo, 17α-acyloxy derivative of Compounds C.

The invention may be illustrated by the following examples, all temperatures are in degrees centigrade unless otherwise stated.

EXAMPLE 1

12β,17α-dihydroxy-A-norprogesterone (A) *Fermentation.*—Surface growth from each of 3 two-week-old agar slants of *Corticium microsclerotia* (NRRL–2727), the slants containing as a nutrient medium (A):

|  | Grams |
| --- | --- |
| Oatmeal | 20 |
| Tomato paste | 20 |
| Agar | 15 |
| Tap water to 1 liter | | is suspended in 6 ml. of 0.01% aqueous sodium lauryl sulfate solution. Three ml. portions of this suspension are used to inoculate six 250 ml. Erlenmeyer flasks, each containing 50 ml. of the following sterilized medium (B).

|  | Grams |
| --- | --- |
| Glucose | 30 |
| Soy bean meal | 20 |
| Soy bean oil | 2.2 |
| $CaCO_3$ | 2.5 |
| Distilled water to 1 liter. | |

After seventy-two hours incubation at 25° C. with continuous rotary agitation (280 cycles/minute; two inch radius), 10% (vol./vol.) transfers are made to thirty-four 250 ml. Erlenmeyer flasks each containing 50 ml. of the following sterilized medium (C):

|  | Grams |
| --- | --- |
| Dextrose | 10 |
| Corn steep liquor | 6 |
| $NH_4H_2PO_4$ | 3 |
| Yeast extract | 2.5 |
| $CaCO_3$ | 2.5 |
| Distilled water to 1 liter. | |

After twenty-four hours incubation, using the same conditions as described above, the steroid (300 micrograms/ml.) is added by supplementing each flask with 0.25 ml. of a sterile solution (60 mg./ml.) of 17α-hydroxy-A-norprogesterone in N,N-dimethylformamide. A total of 510 mg. is fermented. After thirty hours of further incubation using identical conditions as described above, the contents of the flasks are pooled and the broth is then filtered through a Seitz clarifying pad. The flasks, mycelium and pad are washed with successive 50 ml. portions of warm water. The combined filtrate and washings have a volume of 1800 ml.

(B) *Isolation.*—The thus obtained filtrate is extracted three times with 600 ml. portions of chloroform. The chloroform extracts are washed three times with 600 ml. portions of water, dried over sodium sulfate, and evaporated in vacuo to give 217 mg. of 12β,17α-dihydroxy-A-norprogesterone having a melting point of 217–219°. The analytical sample is prepared by recrystallization from acetone, M.P. 221–223°; $[\alpha]_D^{25}+2°$ (EtOH); $\lambda^{KBr}$ 2.92, 5.90, 5.98 and 6.18μ;

$$\lambda_{max.}^{EtOH} 233 \, m\mu \, (16,300)$$

$\tau^{TMS}$ 9.14 (s, 18-Me), 8.81 (s, 19-Me), 7.62 (s, 21-Me), 6.53 (s, 17-hydroxy), 6.03 (d, J-4 c.p.s., 12α-H) and 4.25 (s, 3-H).

*Analysis.*—Calc'd for $C_{20}H_{28}O_4$ (332.42): C, 72.26; H, 8.49. Found: C, 72.27; H, 8.33.

EXAMPLE 2

12β,17α-diacetoxy-A-norprogesterone

A solution of 0.0033 ml. of perchloric acid in 0.3 ml. of acetic anhydride is added to 500 mg. of 12β,17α-dihydroxy-A-norprogesterone in 10 ml. of acetic anhydride. The reaction mixture is stirred at room temperature for 0.5 hour, and then poured into ice-water and extrarted with chloroform. The chloroform extracts are washed with a saturated sodium bicarbonate solution, 8% salt solution, dried over sodium sulfate and evaporated to dryness to give 12β,17α-diacetoxy-A-norprogesterone.

EXAMPLE 3

12-keto-17α-hydroxy-A-norprogesterone

A solution of 30 mg. of 12β-17α-dihydroxy-A-norprogesterone in 4 ml. of acetone is treated dropwise with an equivalent amount of chromium trioxide-sulfuric acid. The chromic sulfate is removed by filtration, and washed with additional acetone. The filtrate is concentrated, diluted with water and extracted with chloroform. The chloroform extracts are washed with 8% salt solution, dried over sodium sulfate and evaporated to dryness. Crystallization of the residue from chloroform-isopropyl ether gives 15 mg. of 12-keto-17α-hydroxy-A-norprogesterone having a melting point of 178–179°. The analytical sample is prepared by recrystallization from chloroform-isopropyl ether, M.P. 180.5–181.5°, $\lambda^{KBr}$ 2.92, 5.88, and 6.17μ;

$$\lambda_{max.}^{EtOH} 231 \, m\mu \, (15,700)$$

*Analysis.*—Calc'd for $C_{20}H_{26}O_4$ (330.41): C, 72.70; H, 7.93. Found: C, 72.80; H, 8.16.

EXAMPLE 4

12-keto-17α-acetoxy-A-norprogesterone

Following the procedure in Example 2 but substituting 12-keto-17α-hydroxy-A-norprogesterone for 12β,17α-dihydroxy-A-norprogesterone there is obtained 12-keto-17α-acetoxy-A-norprogesterone.

While there have been described various embodiments of the invention, the compositions and methods described are not intended to be understood as limiting the scope of the invention, as it is realized that changes therein are possible and it is further intended that each element recited in any of the following claims is to be understood as referring to all equivalent elements for accomplishing substantially the same results in substantially the same or equivalent manner, it covering the invention broadly in whatever form its principle may be utilized.

What is claimed is:
1. A process for the preparation of the compound having the formula
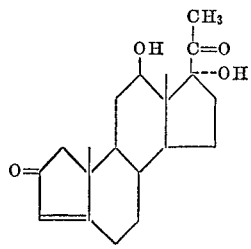
which comprises subjecting 17α-hydroxy-A-norprogesterone to the action of *Corticium microsclerotia*.
References Cited
UNITED STATES PATENTS
2,964,450  12/1960  Fried et al. _____ 195—51
3,324,184   6/1967  Diassi _____ 195—51
ALVIN E. TANENHOLTZ, *Primary Examiner*.